US006856927B2

(12) United States Patent
Dorrer et al.

(10) Patent No.: US 6,856,927 B2
(45) Date of Patent: *Feb. 15, 2005

(54) METHOD AND APPARATUS FOR THE CHARACTERIZATION OF OPTICAL PULSES AND MODULATORS

(75) Inventors: Christophe Jean Dorrer, Matawan, NJ (US); Inuk Kang, Matawan, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 89 days.

This patent is subject to a terminal disclaimer.

(21) Appl. No.: 10/338,355

(22) Filed: Jan. 8, 2003

(65) Prior Publication Data

US 2004/0133372 A1 Jul. 8, 2004

(51) Int. Cl.[7] .............................................. G06F 19/00
(52) U.S. Cl. ........................ 702/76; 702/57; 702/70; 702/76; 702/126; 385/2; 385/5; 375/242; 359/237; 356/5.08; 356/5.11
(58) Field of Search ............................. 702/57, 66, 70, 702/74–76, 124–126, 182, 189; 385/1, 2, 4, 5; 375/242; 359/237; 356/5.08, 5.11

(56) References Cited

U.S. PATENT DOCUMENTS

| 5,530,544 | A | | 6/1996 | Trebino et al. | ............. | 356/345 |
| 5,754,292 | A | | 5/1998 | Kane et al. | ................. | 356/345 |
| 6,008,899 | A | | 12/1999 | Trebino et al. | ............. | 356/345 |
| 6,160,626 | A | * | 12/2000 | Debeau et al. | ............. | 356/451 |
| 6,485,413 | B1 | * | 11/2002 | Boppart et al. | ............. | 600/160 |

OTHER PUBLICATIONS

Dorrer et al.,'Characterization of the spectral phase of ultrashort light pulses', Sep. 2001, UOR, pp. 1415–1426.*
Siders et al.,'Multipulse Interferometric Frequency–Resolved Optical Gating', Apr. 1999, IEEE, vol.:35, No. 4, pp. 432–440.*
"Characterization of the Electric Field of Ultrashort Optical Pulses," I. A. Walmsley and V. Wong, vol. 13, No. 11, Nov. 1996, J. Opt. Soc. Am. B, pp. 24532463.
"Measuring Ultrashort Laser Pulses in the Time–Frequency Domain Using Frequency–Resolved Optical Gating," R. Trebino et al., Rev. Sci. Instrum. 68(9), Sept. 1997, pp. 3277–3295.
"Real–Time Measurement of Ultrashort Laser Pulses Using Principle Component Generalized Projections," D. J. Kane, IEEE J. of Selected Topics of Quantum Electronics, vol. 4, No. 2, Mar./Apr. 1998, pp. 278–284.
"Recent Progress Toward Real–Time Measurement of Ultrashort Laser Pulses," D. J. Kane, IEEE Journal of Quantum Electronics, vol. 35, No, 4, Apr. 1999, pp. 421–431.

* cited by examiner

*Primary Examiner*—Marc S. Hoff
*Assistant Examiner*—Elias Desta

(57) ABSTRACT

A method and apparatus for the characterization of optical pulses and modulators includes modulating, using a modulator, a train of optical pulses, measuring a spectrum of the modulated train of optical pulses, recording the measured spectrum as an entry in a spectrogram at a position in the spectrogram corresponding to a relative delay between the modulation and the train of optical pulses, incrementing the relative delay, and repeating the above steps until the accumulated relative delay is equal to the period of the spectrogram. The train of optical pulses and the modulator are then characterized using the measured spectra recorded in the spectrogram.

40 Claims, 6 Drawing Sheets

700

800

METHOD AND APPARATUS FOR THE CHARACTERIZATION OF OPTICAL PULSES AND MODULATORS

FIELD OF THE INVENTION

This invention relates to the field of optical communication systems and, more specifically, to the characterization of optical pulses and modulators in communication systems.

BACKGROUND OF THE INVENTION

In optical communications systems, it is necessary to characterize the phase and amplitude of optical pulses as accurately as possible in order to predict and mitigate signal degradation. For example, in long distance wavelength-division multiplexed (WDM) systems optical signals generate nonlinear effects such as self-phase modulation or cross-phase modulation, which degrade the transmission properties of an optical signal. Additionally, characterizing the performance of a temporal modulator in an optical communication system can be advantageous in assessing the effectiveness of the communication system. Such characterizations of the effect of the distortions on a propagating optical signal and the performance of a temporal modulator can assist in determining corrective measures for an optical communications system.

As the need for information increases, though, so does the demand for higher speed and higher capacity communication systems. Higher speed communication systems mean shorter optical pulses for transmission at higher bit rates (e.g., approximately 8 ps pulses for 40 Gb/s systems), and fast (even ultrafast) optical components to process higher bit rate optical signals. Techniques for the time-frequency analysis of the electrical field of a short optical pulse typically require a non-stationary filter element capable of modulating the amplitude and phase of the pulse on a time scale of the order of its duration. In the domain of femtosecond pulses, these techniques are generally realized using the nonlinear interaction of the short pulse to be characterized with one or several other short pulses in a quasi-instantaneous nonlinear medium. These nonlinear interactions require nonlinear optics which require fairly intense pulses. As such, these nonlinear techniques are impractical for low power applications such as telecommunication systems, which typically have peak powers as low as 0.1 mW or less.

In regard to characterizing optical modulators, time-frequency analysis can also be used to measure the dynamic switching characteristics of optical modulators, used for example for pulse carving and all-optical signal processing. Typically, both the amplitude and the phase of the temporal response are needed to characterize the action of these modulators on light. Similar to the time-frequency analysis of the electrical field of a short optical pulse, the amplitude and the phase of the temporal response of an optical modulator is difficult to obtain with picosecond resolution implementing current analytical techniques.

SUMMARY OF THE INVENTION

The present invention advantageously provides a novel method and apparatus for the characterization of optical pulses and modulators.

In one embodiment of the present invention, a method for the characterization of optical pulses and modulators includes modulating, using a modulator, a train of optical pulses, measuring a spectrum of the modulated train of optical pulses, recording the measured spectrum as an entry in a spectrogram at a position in the spectrogram corresponding to the relative delay between the modulation and the train of optical pulses, incrementing the relative delay, and repeating the above steps until the accumulated relative delay is equal to the period of the spectrogram. The train of optical pulses and the modulator are then characterized using the measured spectra recorded in the spectrogram.

In another embodiment of the present invention, an apparatus for characterizing a train of optical pulses and a modulator includes a modulator for modulating the train of optical pulses, a drive unit for controlling the modulation of the modulator, a detector for measuring the spectrum of the train of optical pulses, a delay unit for incrementing the relative delay between the modulation and the train of optical pulses, and a characterization control unit including a memory for storing a spectrogram and program instructions, and a processor for executing the instructions. Upon executing the instructions, the apparatus is configured to perform the steps of modulating, using the modulator, the train of optical pulses, measuring a spectrum of the modulated train of optical pulses, recording the measured spectrum as an entry in the spectrogram at a position in the spectrogram corresponding to a relative delay between the modulation and the train of optical pulses, incrementing the relative delay, and repeating the above steps until an accumulated relative delay is equal to the period of the spectrogram. The train of optical pulses and the modulator are then characterized using the measured spectra recorded in the spectrogram.

In another embodiment of the present invention, an apparatus for characterizing a train of optical pulses and a modulator includes an optical pulse source for providing the train of optical pulses to the modulator, a drive unit for controlling the modulation of the modulator, a detector for measuring the spectrum of the train of optical pulses, a delay unit for incrementing the relative delay between the modulation and the train of optical pulses, and a characterization control unit comprising a memory for storing a spectrogram and program instructions and a processor for executing the instructions. Upon executing the instructions, the apparatus is configured to perform the steps of modulating, using the modulator, the train of optical pulses, measuring a spectrum of the modulated train of optical pulses, recording the measured spectrum as an entry in the spectrogram at a position in the spectrogram corresponding to the relative delay between the modulation and the train of optical pulses, incrementing the relative delay, and repeating the above steps until the accumulated relative delay is equal to the period of the spectrogram. The train of optical pulses and the modulator are then characterized using the measured spectra recorded in the spectrogram.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method and apparatus for the fast, highly sensitive characterization of optical pulses and temporal modulators. Although the present invention will be described within the context of an optical communication system comprising specific components (e.g., electro-absorption EAM modulators (EAM)), it will be appreciated by those skilled in the art that the present invention can be advantageously implemented in substantially any application wherein it is desirable to characterize an optical signal or a modulator.

The inventors have discovered a linear technique for characterization of optical pulses using temporal modulation, instead of a nonlinear optical interaction. A spectrogram of the train of pulses under test is constructed by measuring the spectrum of the gated train of pulses as a function of the relative delay between the train of pulses and the temporal gate. From this time-frequency representation, complete information about the train of pulses and the gate is extracted without any assumption. The use of the temporal gating from a modulator gives two critical advantages over the conventional nonlinear optical characterization techniques, including those characterization techniques that provide a gating mechanism using non-linear optics. Firstly, the technique is equally powerful at retrieving the time-resolved amplitude and phase of the transfer function of the modulator. It can thus be used to characterize the optical switches in all-optical signal processing or the chirping characteristic of a transmitter. There is virtually no restriction on the modulators that can be used as a gate as long as the gate width is comparable (within a factor of 10 for signal-to-noise ratio of ~$10^3$) to the duration of the pulses to be measured.

The spectrogram corresponding to the train of pulses gated by the modulator, respectively represented by the electric field E(t) and the transfer function R(t), is a two-dimensional array composed of the spectra of the train of pulses gated by the modulator, measured as a function of the optical frequency ω for various relative delays τ between the train of pulses and the action of the modulator. The mathematical description of the spectrogram is therefore $$S(\omega, \tau) = \left| \int_{-\infty}^{+\infty} E(t)R(t-\tau)\exp(-i\omega t) \right|^2,$$

where E(t)R(t−τ) is the temporal electric field of the train of pulses after modulation for the relative delay τ, and the modulus square of the Fourier transform of that quantity represents the optical spectrum of the electric field after modulation. Because the period of the electric field is T' and the period of the modulation is T'', the smallest common multiple of T' and T'' is the period of the spectrogram. The period of the spectrogram is defined by the inventors as T. Therefore, the measurement of the spectrogram only needs to be done for values of the relative delay τ ranging from 0 to T.

Figure 1:
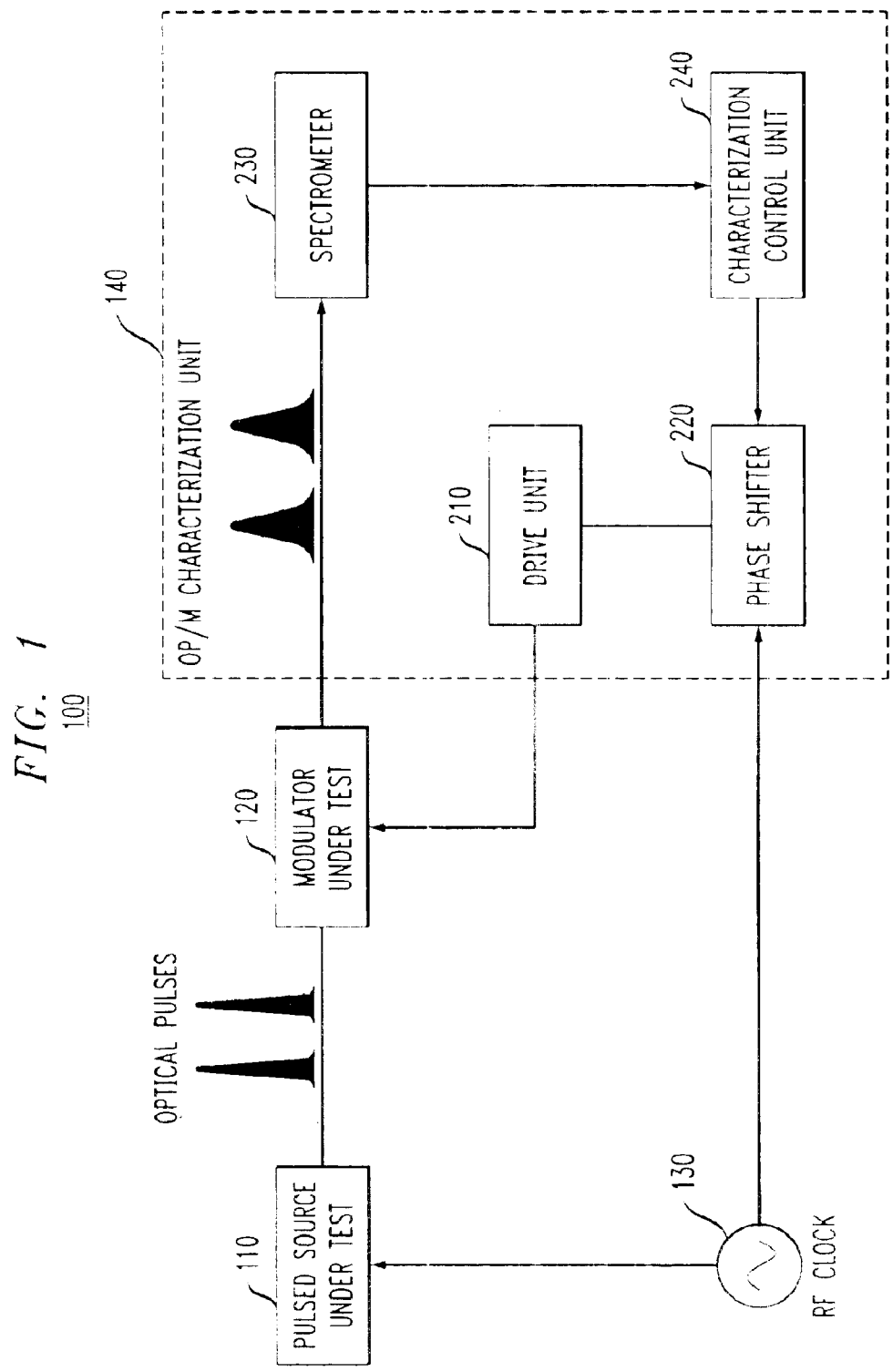
FIG. 1 depicts a high-level block diagram of a test setup including one embodiment of the present invention.

FIG. 1 depicts a high-level block diagram of a test setup including one embodiment of the present invention. In the embodiment of FIG. 1, an optical pulse/modulator (OP/M) characterization unit in accordance with the present invention is configured for the simultaneous characterization of a user provided modulator and user generated optical pulses. The test setup 100 of FIG. 1 comprises a pulsed optical source 110, a temporal modulator (illustratively an electro-absorption modulator (EAM)) 120, a clock (illustratively a radio-frequency (RF) clock) 130, and an OP/M characterization unit 140 in accordance with the present invention. The optical source 110 generates a train of substantially identical pulses at a pulse rate determined by the RF clock 130. A signal from the RF clock 130 is also coupled to the OP/M characterization unit 140. The optical pulses from the optical source 110 are modulated by the pulse modulator 120. Subsequently, the modulated optical pulses are coupled to the OP/M characterization unit 140. It should be noted that additional processing may be undertaken before generating the pulses. For example, in one embodiment of the invention, a 10 GHz RF clock was doubled to generate the train of pulses. As such, the period of the modulation provided by the modulator is 100 ps, while the period of the electric field of the train of pulses is 50 ps. Therefore the period of the spectrogram is 100 ps.

The OP/M characterization unit 140 of FIG. 1 comprises a drive unit (illustratively a modulator driver) 210 for the pulse modulator 120, a delay unit (illustratively a programmable phase shifter) 220, an optical frequency resolving detection device (illustratively a spectrometer) 230, and a characterization control unit 240. Although in FIG. 1 some components of the OP/M characterization unit 140 are depicted as illustratively comprising specific components, various other components performing substantially the same functions can be utilized within the context of the present invention. For example, in an alternate embodiment of the present invention, the function of the frequency-resolving device of the OP/M characterization unit is implemented using a Fabry-Perot etalon followed by a photodiode.

In the OP/M characterization unit 140, the optical pulses from the optical source 110, modulated by the modulator 120 are coupled to the spectrometer 230 wherein the spectrum of the modulated train of optical pulses is measured by the spectrometer 230. The spectrometer 230 transmits the spectrum of the modulated optical pulses to the characterization control unit 240. The characterization control unit 240 records the spectrum information of the modulated optical pulses as an entry in a spectrogram maintained in the characterization control unit 240. It should be noted that, in the present embodiment, the modulator 120 under test and the optical pulses created by the optical source 110 are driven at the frequency of the RF clock 130. As mentioned above, a signal from the RF clock 130 is coupled to the modulator driver 210 of the OP/M characterization unit 140 to drive the modulator 120.

The spectrum of the modulated optical pulses is stored in the spectrogram contained in the OP/M characterization unit 140 at a position in the spectrogram corresponding to the relative delay τ between the modulation and the train of optical pulses. That is, the spectrogram is created from a number of entries equaling the number of relative delay increments. For example, if the RF clock operates at 10 GHz, the period of the optical pulses and the modulation are equal to 100 picoseconds. The period of the spectrogram is therefore 100 ps. For a relative delay increment equal to 2 picoseconds, the spectrogram would be comprised of fifty (50) entries and the measured spectrum of the modulated optical pulses would be recorded in the spectrogram at the location of their corresponding relative delay.

Referring back to FIG. 1, after the spectrum of the modulated optical pulses is recorded in the spectrogram contained in the characterization control unit 240 at the location of the corresponding relative delay, the characterization control unit 240 transmits a control signal to the programmable phase shifter 220 to increment the relative delay between the modulation and the train of optical pulses. In this embodiment of the present invention, the programmable phase shifter 220 provides the relative delay by adding a delay to the signal from the RF clock 130 coupled to the modulator driver 210. The optical pulses from the optical source are now modulated by the modulator 120 for a different relative delay. It should be noted that within the concepts of the present invention, the relative delay between the modulation and the train of optical pulses can be incremented in positive or negative intervals.

Figure 2:
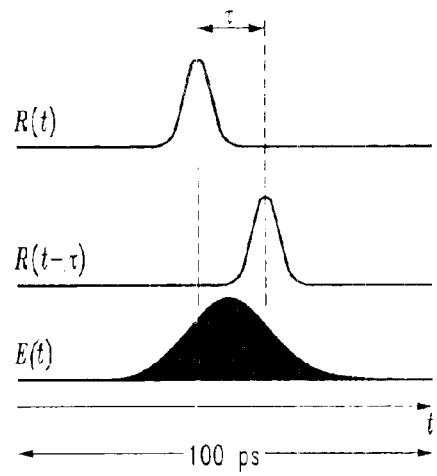
FIG. 2 graphically depicts the action of adding a relative time delay between a train of optical pulses and the modulation of a modulator in accordance with one embodiment of the present invention.

FIG. 2 depicts the action of adding a relative time delay between a train of optical pulses and the modulation of a modulator according to the present invention. In FIG. 2, the period of the train of optical pulses and of the modulation are equal to 100 ps. A change of relative delay by the quantity τ is depicted. Considering the referential of the optical pulse, the position of the modulation R(t) has been modified by the quantity τ between the upper and the lower representations of the modulation. The spectrum of the modulated train of pulses in the first case would be stored in the first line of the spectrogram, corresponding to a relative delay equal to zero, while the spectrum of the modulated train of pulses in the second case would be stored in another line, corresponding to that specific value of the relative delay τ. For example, the spectrogram can be measured as the spectra of the modulated pulses for 50 different values of the relative delay in the 100 ps window, where these 50 delays uniformly map that time window. Although in the above embodiment a relative delay is added by providing a delay to the modulation, in an alternate embodiment of the present invention a relative delay is provided, within the teachings of the present invention, by keeping the modulation fixed and delaying the optical pulses by, for example, providing a delay to the signal from the RF clock 130 to the optical source 110. The optical pulses produced by the optical source 110 will then have a relative delay compared to the modulation of the optical pulses by the modulator 120.

Returning to FIG. 1, the optical spectrum of the newly modulated optical pulses is then once again measured by the spectrometer 230. The spectrometer 230 transmits the spectrum information of the newly modulated optical pulses to the characterization control unit 240. The characterization control unit 240 records the spectrum information of the newly modulated optical pulses at the location of the corresponding relative delay in the spectrogram. The characterization control unit 240 then sends a control signal to the programmable phase shifter 220 to again increment the relative delay between the action of the modulator 120 and the train of optical pulses. This process continues until the accumulated relative delay is equal to the period of the spectrogram. In one embodiment of the present invention, the relative delay may be incremented in equal intervals until the accumulated relative delay is equal to the period of the spectrogram.

Although in FIG. 1 the phase shifter 220 is depicted as being located between the modulator driver 210 and the RF clock 130 and imparting a delay on the clock signal from the RF clock 130 to the modulator driver 210, it is within the teachings of the present invention that the phase shifter 220 could also be located between the modulator driver 210 and the modulator 120 and impart a delay on the signal between the modulator driver 210 and the modulator 120.

In an alternate embodiment of the present invention, the function of the delay unit for providing a relative delay between the train of optical pulses and the modulation is accomplished using a delay line. That is, the train of optical pulses is delayed using an optical delay line, i.e. a device that modifies the optical path (for example the distance) that needs to be traveled by the optical pulses before reaching the characterization unit. In that embodiment, the time of arrival of the train of optical pulses at the characterization unit is modified, while all the other parameters are kept constant.

In the embodiment of FIG. 1, the spectrogram maintained in the characterization control unit 240 may be comprised of various cell numbers in accordance with the present invention. It should be noted though, that the number of cells in the spectrogram is related to the relative delay increment size (i.e., the number of relative delays that are used) and the period of the spectrogram.

Figure 3:
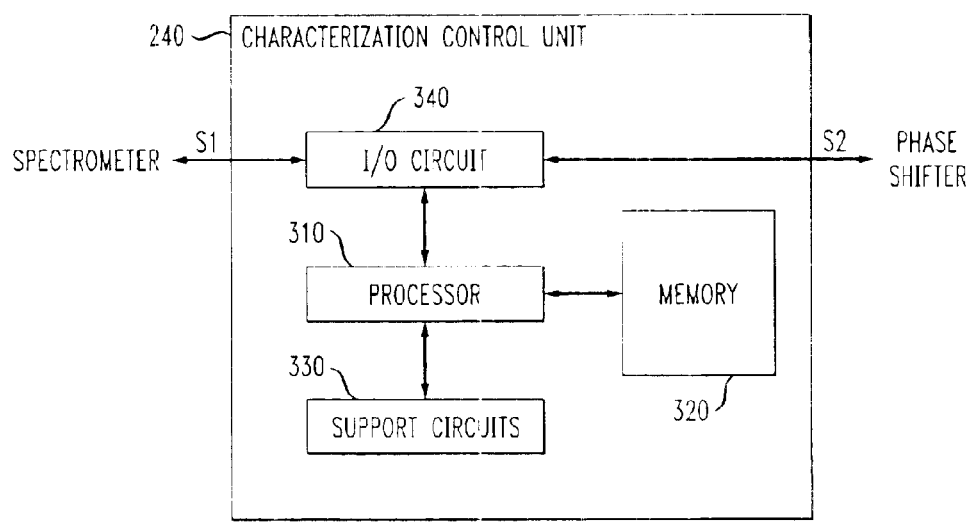
FIG. 3 depicts a block diagram of an embodiment of a characterization control unit suitable for use in the OP/M characterization unit of FIG. 1.

FIG. 3 depicts a block diagram of an embodiment of a characterization control unit 240 suitable for use in the OP/M characterization unit of FIG. 1. The characterization control unit 240 of FIG. 3 comprises a processor 310 as well as a memory 320 for storing algorithms, control programs and spectrograms. The processor 310 cooperates with conventional support circuitry 330 such as power supplies, clock circuits, cache memory and the like as well as circuits that assist in executing the software routines stored in the memory 320. As such, it is contemplated that some of the process steps discussed herein as software processes may be implemented within hardware, for example, as circuitry that cooperates with the processor 310 to perform various steps. The characterization control unit 240 also contains input-output circuitry 340 that forms an interface between the various functional elements communicating with the characterization control unit 240. For example, in the embodiment of FIG. 1, the characterization control unit 240 communicates with the spectrometer 230 via a signal path S1 and to the phase shifter 220 via signal path S2.

Although the characterization control unit 240 of FIG. 3 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Figure 4:
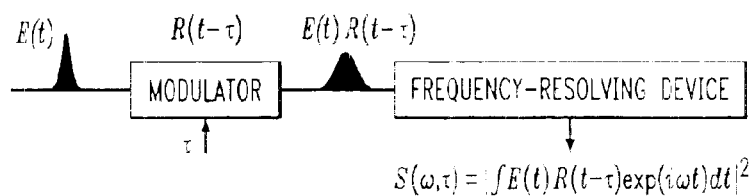
FIG. 4 graphically depicts a representation of the principle of the measurement of the spectrogram in accordance with one embodiment of the present invention.

FIG. 4 depicts a graphical representation of the principle of the measurement of the spectrogram in accordance with the present invention. For a train of optical pulses represented by the analytic signal E(t) and a temporal modulator with a response R(t), both quantities being complex, the procedure for the measurement of the spectrogram corresponding to E(t) and R(t) is represented by FIG. 4. A programmable delay τ between the train of optical pulses and the temporal modulation is set so that the output pulse is related to the input pulse by E'(t,τ)=E(t)R(t−τ). A spectrogram, S(ω,τ), is then constructed by measuring the spectrum of the modulated pulse as a function of the optical frequency ω and relative delay τ as represented in Equation (1) below:

$$S(\omega, \tau) = \left| \int_{-\infty}^{+\infty} E'(t, \tau) \exp(-i\omega t) dt \right|^2 = \left| \int_{-\infty}^{+\infty} E(t) R(t-\tau) \exp(-i\omega t) \right|^2 \quad (1)$$

The extraction of both the optical pulse E(t) and the modulator (gate) R(t) from the measured spectrogram S(ω,τ) is performed by an algorithm in the characterization control unit implementing two-dimensional blind deconvolution. Such retrieval falls into the category of the phase retrieval problem, which consists of finding the two-dimensional quantity E'(t,τ) from the knowledge of S(ω,τ) and the functional shape of E'(t,τ). This is performed in one embodiment, for example, using the Principal Component Generalized Projection Algorithm (D. J. Kane, "IEEE Journal of Selected Topics in Quantum Electronics", vol. 4, 278–284, (1998)), which is herein incorporated by reference. The solution is in most cases unique. Switching the temporal modulator to a state with a constant response function allows the measurement of the spectrum of the optical pulse, which can be injected in the algorithm to remove possible cases of ambiguities. The retrieval does not require any assumption and provides the complete description of the pulse and the modulator, except for meaningless time delays and phase constants. As such, the phase and the amplitude of optical pulses are accurately determined. The accurate determination of the phase and amplitude of optical pulses propagating in a transmission medium is essential in predicting and mitigating signal degradation in the medium. The dynamic switching characteristics (transfer function) of the temporal modulator are also accurately determined by this method.

In an experiment, the inventors generated a 10 GHz train of identical picosecond pulses by modulation of monochromatic light at 1541 nm from a transmitter with a commercially available electro-absorption modulator (EAM) driven by a 10 GHz sinusoid driver. The temporal gate of the OP/M characterization unit was created with a substantially identical EAM driven at the same frequency by a substantially identical 10 GHz sinusoid driver. A phase shifter was used to add a programmable delay to the modulator driver of the temporal gate. The optical spectra of the gated pulses were measured with a commercially available optical spectrum analyzer. Fifty delays mapping the 100-ps period of the train of the pulses (i.e., with a 2 ps step size) were used, and the spectrogram was resampled to a 64 by 64 cell spectrogram before inversion. The experiments were performed at an average power of 0.1 mW or less.

The original pulse was first characterized, and was characterized again after linear propagation in a Standard Single Mode Fiber (SSMF) and a Dispersion Compensating Fiber (DCF). As expected, dispersion does not modify the spectrum of the pulses, but modifies their spectral phases. The measured second order dispersions of these fibers, obtained by comparing the difference between the spectral phases before and after propagation into the fiber, are respectively −27.2 $ps^2$ and 48.6 $ps^2$, and agree well with the known values, respectively −28.9 $ps^2$ and 47 $ps^2$. It should be noted that the difference between the measured and the calculated dispersions does not significantly modify the retrieved pulse shape, which is the quantity that is measured in this experiment. The measured and retrieved spectrograms match very well, and the RMS variation between the traces is of the order of $3\times10^{-3}$ for 64 by 64 traces, without the need for any filtering of the experimental spectrogram. This is attributed to the high dynamic range of the optical spectrum analyzer used.

The original pulse was also amplified to 150 mW and propagated through a nonlinear optical fiber in order to broaden the spectrum by self-phase modulation. The output pulse was then recompressed down to 5 ps by linear propagation into a SSMF. As is expected from a non-linear fiber with small spectral dispersion and high nonlinearity, the temporal intensity of the pulse is not modified by the propagation, but the pulse acquires a large temporal phase proportional to its temporal intensity. The nonlinear propagation constant of this fiber, obtained by comparing the temporal intensity of the input pulse with the nonlinear temporal phase induced by the propagation obtained from our measurement is $\gamma=10.7$ $W^{-1}km^{-1}$, in good agreement with the specification of $\gamma=10$ $W^{-1}km^{-1}$. Note that this technique accurately characterizes a 5 ps pulse with the 30 ps gate, whereas directly sampling of the intensity would require a detector with a response time of the order of 1 ps, or an optical pulse with a similar duration.

All of the spectrograms were measured with the same temporal gate (in practice, no change was made to the constant bias and amplitude of the sinusoidal voltage driving the EAM used as a gate). The retrieved phase and transmission of the temporal gate were compared in the case of the initial pulse, the pulse after linear propagation in the SMF and the pulse after non-linear propagation. An excellent agreement between the determinations of the characteristics (i.e., the temporal phase and transmission) of the gate (modulator) obtained in the 3 cases validates the accuracy of the invention.

Finally, a test of the sensitivity of the OP/M characterization unit was performed by characterizing a train of pulses with an average power of 0.1 mW, then attenuating it to 0.1 _W and characterizing it again. The retrieved pulses were substantially identical to the experiment performed with an average power of 0.1 mW. With an energy equal to $10^{-17}$ J, each pulse in the train only has approximately 70 photons. Even at this level, the RMS error between the two traces is below $3\times10^{-3}$.

Figure 5:
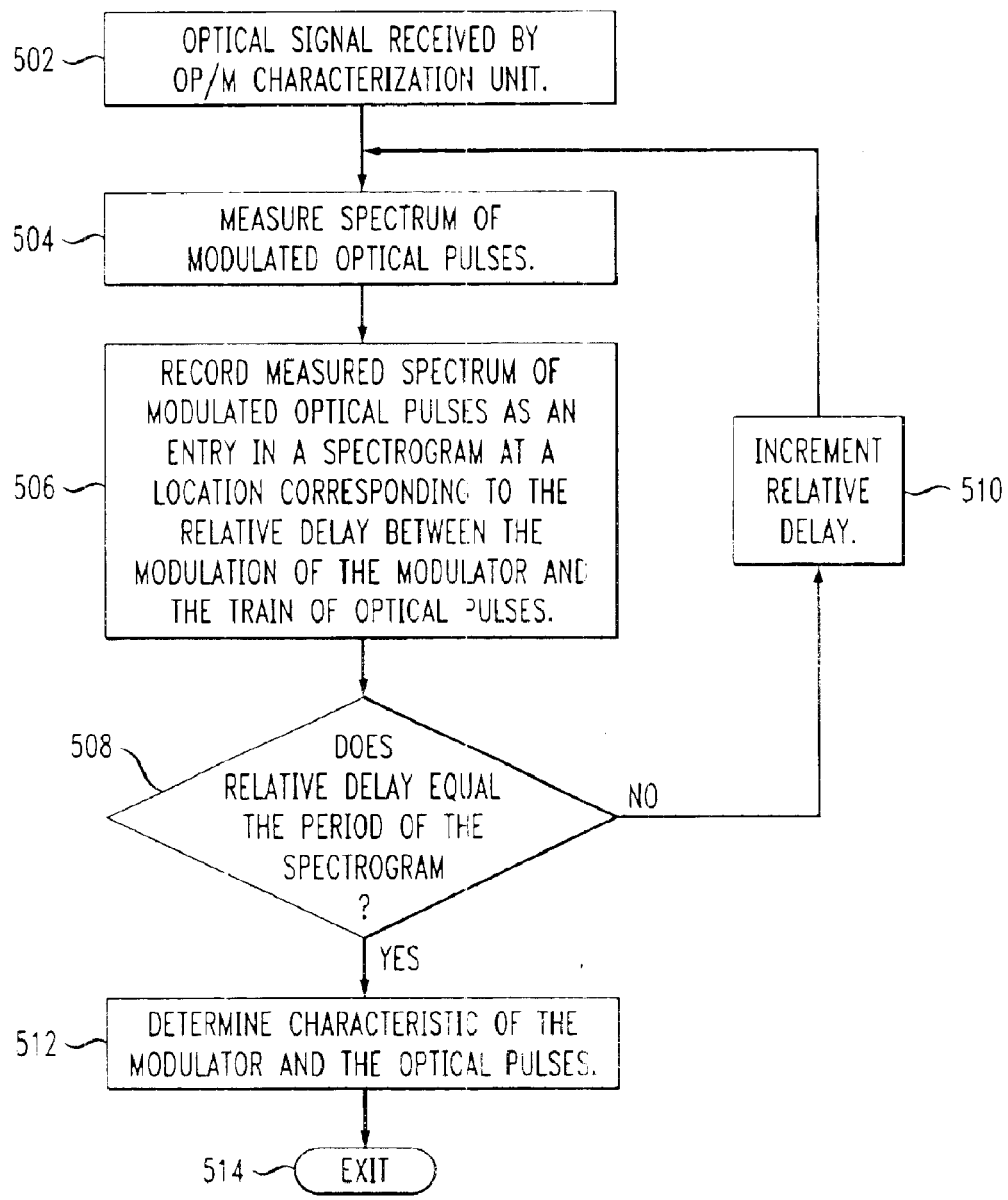
FIG. 5 depicts a flow diagram of an embodiment of a method for the characterization of optical pulses and modulators using in accordance with an embodiment of the present invention.

FIG. 5 depicts a flow diagram of an embodiment of a method 500 for the characterization of optical pulses and modulators in accordance with an embodiment of the present invention.

The method 500 is entered at step 502, wherein modulated optical pulses are received by a detector of the OP/M characterization unit of the present invention. The method 500 then proceeds to step 504.

At step 504, the spectrum of the modulated optical pulses is measured. That is, the detector of the OP/M characterization unit measures the spectrum of the received modulated optical pulses. The method 500 then proceeds to step 506.

At step 506, the measured spectrum of the modulated optical pulses is recorded as an entry in a spectrogram contained in a characterization control unit of the OP/M characterization unit at a location corresponding to the relative delay between the modulation of the modulator and the train of optical pulses. The method 500 then proceeds to step 508.

At step 508, the method 500 determines if the accumulated relative delay is equal to the spectrogram period. If the relative delay is not equal to the spectrogram period, the method 500 proceeds to step 510. If the accumulated relative delay is equal to the spectrogram period, the method 500 proceeds to step 512.

At step 510, the relative delay is incremented. That is, the characterization control unit sends a control signal to the phase shifter to add a delay to the RF clock signal to the modulator driver of the OP/M characterization unit to increment the relative delay between the modulation of the modulator and the train of optical pulses. The method 500 then returns to step 504.

At step 504 in this subsequent iteration, the spectrum of the newly modulated optical pulses is measured. The method then proceeds to step 506.

At step 506 in this subsequent iteration, the measured spectrum of the train of optical pulses is recorded as an entry in a spectrogram contained in a characterization control unit of the OP/M characterization unit at a location corresponding to the relative delay between the modulation of the modulator and the train of optical pulses. The method 500 then proceeds to step 508.

At step 508 in this subsequent iteration, the method 500 again determines if the accumulated relative delay is equal to the spectrogram period. If the relative delay is not equal to the spectrogram period, the method 500 proceeds to step 510. If the accumulated relative delay is equal to the pulse period, the method 500 proceeds to step 512.

At step 510 in this subsequent iteration, the relative delay is again incremented. That is, the characterization control unit again sends a control signal to the phase shifter to add a delay to the RF clock signal to the modulator driver of the OP/M characterization unit to increment the relative delay between the modulation of the modulator and the train of optical pulses. The method 500 then returns to step 504. This process continues until the accumulated relative delay is equal to the spectrogram period. Again, at this point, the method 500 then proceeds to step 512.

At step 512, the characteristics of the optical pulses and the modulator are calculated using the algorithm stored in a memory of the characterization control unit. The method 500 is then exited at step 514.

Figure 6:
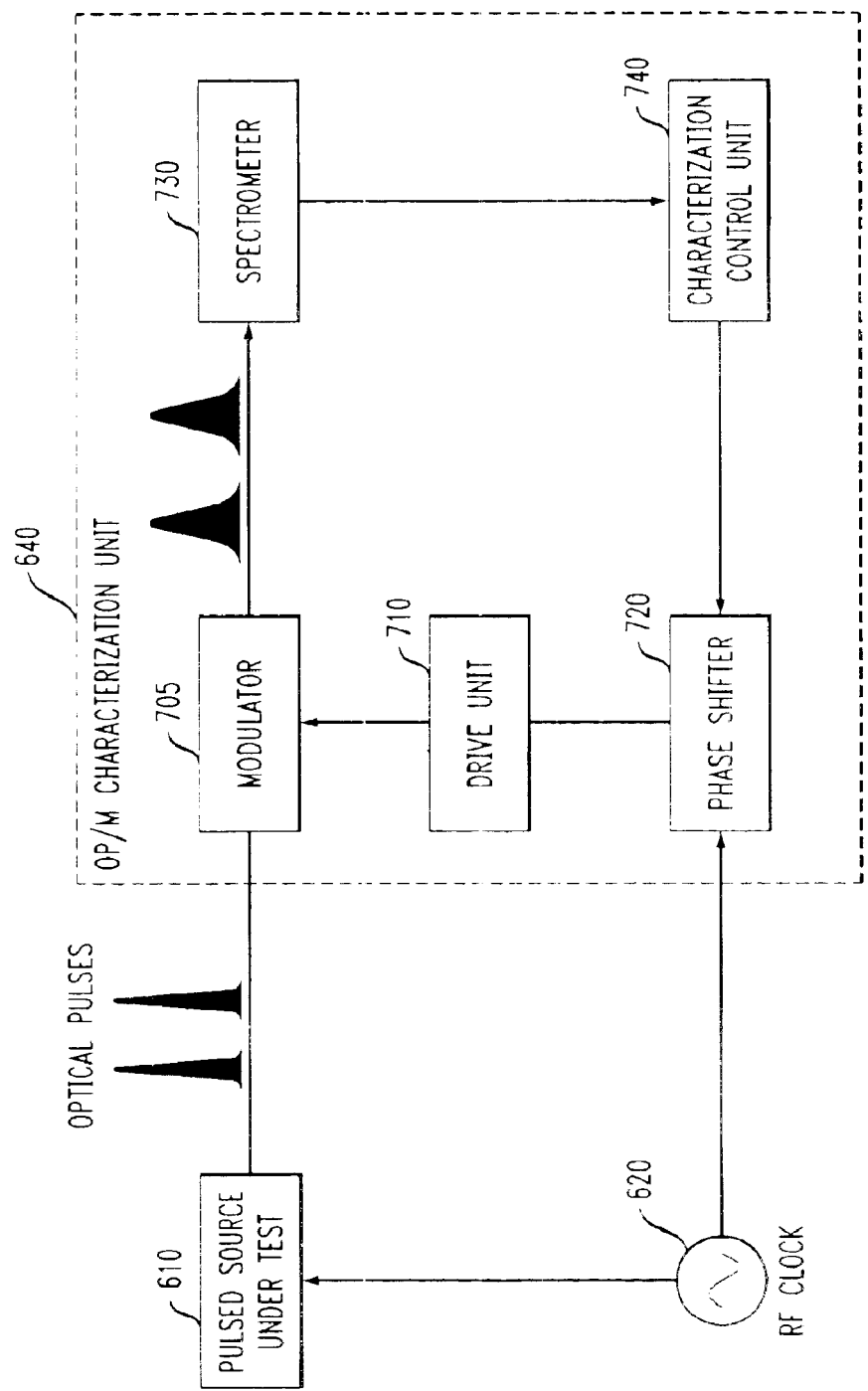
FIG. 6 depicts a high level block diagram of a test setup including a second embodiment of the present invention.

FIG. 6 depicts a high level block diagram of a test setup including an alternate embodiment of an OP/M characterization unit of the present invention. The OP/M characterization unit of FIG. 6 is configured for the simultaneous characterization of user generated optical pulses and a modulator provided within the OP/M characterization unit. The test setup 600 of FIG. 6 comprises a pulsed optical source 610, a clock (illustratively a radio-frequency (RF) clock) 620, and an OP/M characterization unit 640 in accordance with the present invention. The optical source 610 generates a train of pulses at a pulse rate determined by the RF clock 620. A signal from the RF clock 620 is also coupled to the OP/M characterization unit 640. The optical pulses from the optical source 610 are coupled to the OP/M characterization unit 640.

The OP/M characterization unit 640 of FIG. 6 comprises a modulator 705, a drive unit (illustratively a modulator driver) 710 for the modulator 705, a delay unit (illustratively a programmable phase shifter) 720, a detector capable of interpreting at least the phase and amplitude information of the optical pulses (illustratively a spectrometer) 730, and a characterization control unit 740. Although in FIG. 6 some components of the OP/M characterization unit 640 are depicted as illustratively comprising specific components, various other components performing substantially the same functions can be utilized within the context of the present invention. For example, in an alternate embodiment of the present invention, the function of the frequency-resolving device of the OP/M characterization unit is implemented using a Fabry-Perot etalon followed by a photodiode.

In the OP/M characterization unit 640, the optical pulses from the optical source 610 are received and modulated by the modulator 705 at a rate determined by the signal from the RF clock 620. The modulated optical pulses are coupled to the spectrometer 730 wherein the spectrum of the modulated optical pulses are measured by the spectrometer 730. The spectrometer 730 transmits the spectrum of the modulated optical pulses to the characterization control unit 740.

The characterization control unit 740 of FIG. 6 operates substantially identically to the characterization control unit 240 of FIG. 1. That is, the characterization control unit 740 records the spectrum information of the measured optical pulses as an entry in a spectrogram maintained in the characterization control unit 740. It should be noted that, in the present embodiment, the modulator 705 in the OP/M characterization unit 640 and the optical pulses created by the optical source 610 are at the frequency of the RF clock 620. This can be accomplished because the signal from the RF clock 620 driving the optical source 610 is coupled to the modulator driver 710 of the OP/M characterization unit 640 driving the modulator 705.

After the spectrum of the modulated optical pulses is recorded in the spectrogram contained in the characterization control unit 640 in an entry line corresponding to the appropriate relative delay, the characterization control unit 640 transmits a control signal to the programmable phase shifter 720 to increment a relative delay between the modulation and the phase of the optical pulses. The programmable phase shifter 720 provides the relative delay by adding a delay to the signal from the RF clock 620 coupled the modulator driver 710. The optical pulses from the optical source are now modulated by the modulator 705 at a different relative delay.

As mentioned above, although in the above embodiment a relative delay is added by providing a delay to the modulation of the optical pulses, in an alternate embodiment of the present invention, a relative delay is provided, within the teachings of the present invention, by keeping the modulation of the optical pulses fixed and delaying the optical pulses by, for example, providing a delay to the signal from the RF clock 620 to the optical source 610. The optical pulses produced by the optical source 610 will then have a relative delay compared to the modulation of the optical pulses by the modulator 705.

Returning to FIG. 6, as in the first embodiment, the optical spectrum of the newly modulated optical pulses is then once again measured by the spectrometer 730. The spectrometer 730 transmits the spectrum of the newly modulated optical pulses to the characterization control unit 740. The characterization control unit 740 records the spectrum information of the newly modulated optical pulses at the location of the corresponding relative delay in the spectrogram. The characterization control unit 740 then sends a control signal to the programmable phase shifter 720 to again increment the relative delay between the modulation of the modulator 705 and the train of the optical pulses. This process continues until an accumulated relative delay is equal to the period of the spectrogram. The characteristics of the optical pulses and modulator 705 are then determined as described above for the first embodiment of the OP/M characterization unit 140 of FIG. 1.

Figure 7:
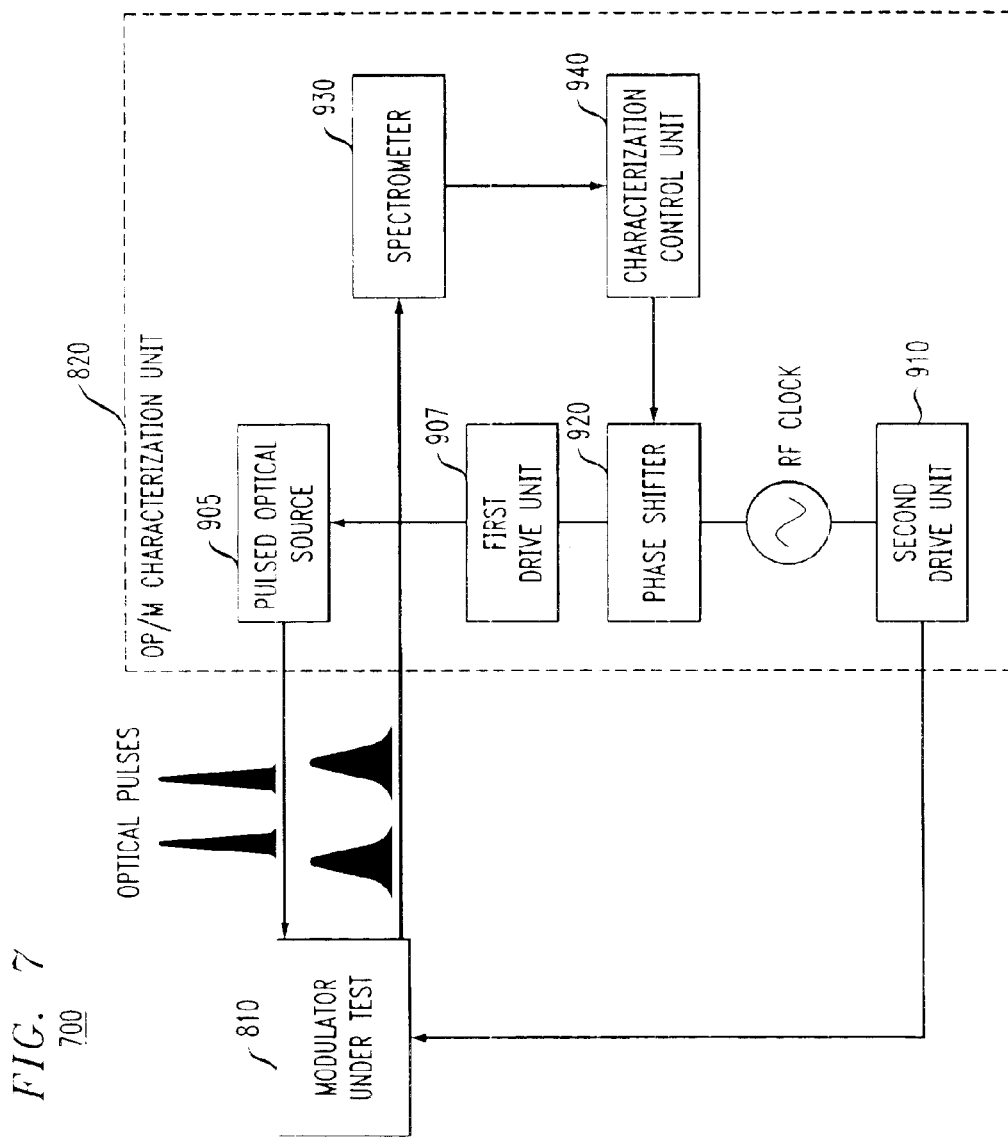
FIG. 7 depicts a high level block diagram of a test setup including a third embodiment of the present invention.

FIG. 7 depicts a high level block diagram of a test setup including a third embodiment of an OP/M characterization unit of the present invention. The OP/M characterization unit of FIG. 7 is configured for the simultaneous characterization of a user provided modulator and an optical pulse source provided within the OP/M characterization unit. The test setup 700 of FIG. 7 comprises a modulator 810 and an OP/M characterization unit 820 in accordance with the present invention.

The OP/M characterization unit 820 of FIG. 7 comprises a pulsed optical source 905, a first drive unit 907 for the optical source 905, a second drive unit (illustratively a modulator driver) 910 for the modulator 810, a delay unit (illustratively a programmable phase shifter) 920, a frequency-resolving device (illustratively a spectrometer) 930, a characterization control unit 940, and a RF clock 950. Although in FIG. 7 some components are depicted as illustratively comprising specific components, various other components performing substantially the same functions can be utilized within the context of the present invention. For example in an alternate embodiment, the function of the frequency-resolving device of the OP/M characterization unit is implemented using a Fabry-Perot etalon followed by a photodiode.

Furthermore, although in FIG. 7, the RF clock 950 is depicted as being included in the OP/M characterization unit 820, in an alternate embodiment and within the teachings of the present invention, the RF clock 950 is provided by the user and a signal from the RF clock 950 is input into the OP/M characterization unit via an input location for a clock signal provided in the OP/M characterization unit.

In the OP/M characterization unit 820, the optical pulses from the optical source 905 are received and modulated by the modulator 810. The modulated optical pulses are coupled to the spectrometer 930 wherein the spectrum of the modulated optical pulses is measured by the spectrometer 930. The spectrometer 930 transmits the spectrum of the measured optical pulses to the characterization control unit 940.

The characterization control unit 940 of FIG. 7 operates substantially identically to the characterization control unit 240 of FIG. 1. That is, the characterization control unit 940 records the spectrum information of the measured optical pulses at an entry in a spectrogram maintained in the characterization control unit 940. The position of this entry is defined by the relative delay between the train of optical pulses and the modulation. It should be noted that, in the present embodiment, the modulator 810 and the optical pulses created by the optical source 905 are driven at the frequency of the RF clock 950. This can be accomplished because the signal from the RF clock 950 driving the optical source 905 is coupled to the modulator driver 910 of the OP/M characterization unit 820 driving the modulator 810.

After the spectrum of the modulated optical pulses is recorded in the spectrogram contained in the characterization control unit 940, the characterization control unit 940 transmits a control signal to the programmable phase shifter 920 to increment the relative delay between the modulation and the train of optical pulses. The programmable phase shifter 920 provides the relative delay by adding a delay to the signal from the RF clock 950 coupled the modulator driver 910. The optical pulses from the optical source are now modulated by the modulator 810 at a relative delay as compared to the phase of the optical pulses.

As mentioned above, although in the above embodiment a relative delay is added by providing a delay to the modulation of the optical pulses, in an alternate embodiment of the present invention, a relative delay is provided, within the teachings of the present invention, by keeping the modulation of the optical pulses fixed and delaying the optical pulses by, for example, providing a delay to the signal from the RF clock 950 to the optical source 905. The optical pulses produced by the optical source 905 will then have a relative delay compared to the modulation of the optical pulses by the modulator 810.

As in the first embodiment, the optical spectrum of the newly modulated optical pulses is then once again measured by the spectrometer 930. The spectrometer 930 transmits the spectrum information of the newly modulated optical pulses to the characterization control unit 940. The characterization control unit 940 records the spectrum information of the newly modulated optical pulses at the location of the corresponding relative delay in the spectrogram. The characterization control unit 940 then sends a control signal to the programmable phase shifter 920 to again increment the relative delay between the modulation of the modulator 810 and the phase of the optical pulses. This process continues until the accumulated relative delay is equal to the spectrogram period. The characteristics of the optical pulses and modulator 810 are then determined as described above in the first embodiment of the OP/M characterization unit 140 of FIG. 1.

Although the embodiments of the present invention presented above are depicted as comprising an RF that drives both the optical source and the modulator, alternate embodiments of the present invention comprise a fast detector that provides a time dependent drive to the modulator. Specifically, the train of optical pulses under test is split so that a fraction of it is sent to a fast detector while the remaining fraction is sent to a pulse characterization unit for characterization. The fast detector provides a time dependent signal (either voltage or current) that can be used to drive (either directly or after processing) the modulator. This mode of operation has the advantage of not requiring any synchronization between the train of optical pulses and the modulation. For example, the use of a fast detector as described extends the principle of the invention to the case when an RF clock that has generated the train of pulses under test is not available, or when the train of optical pulses has been generated without the use of an RF clock.

Figure 8:
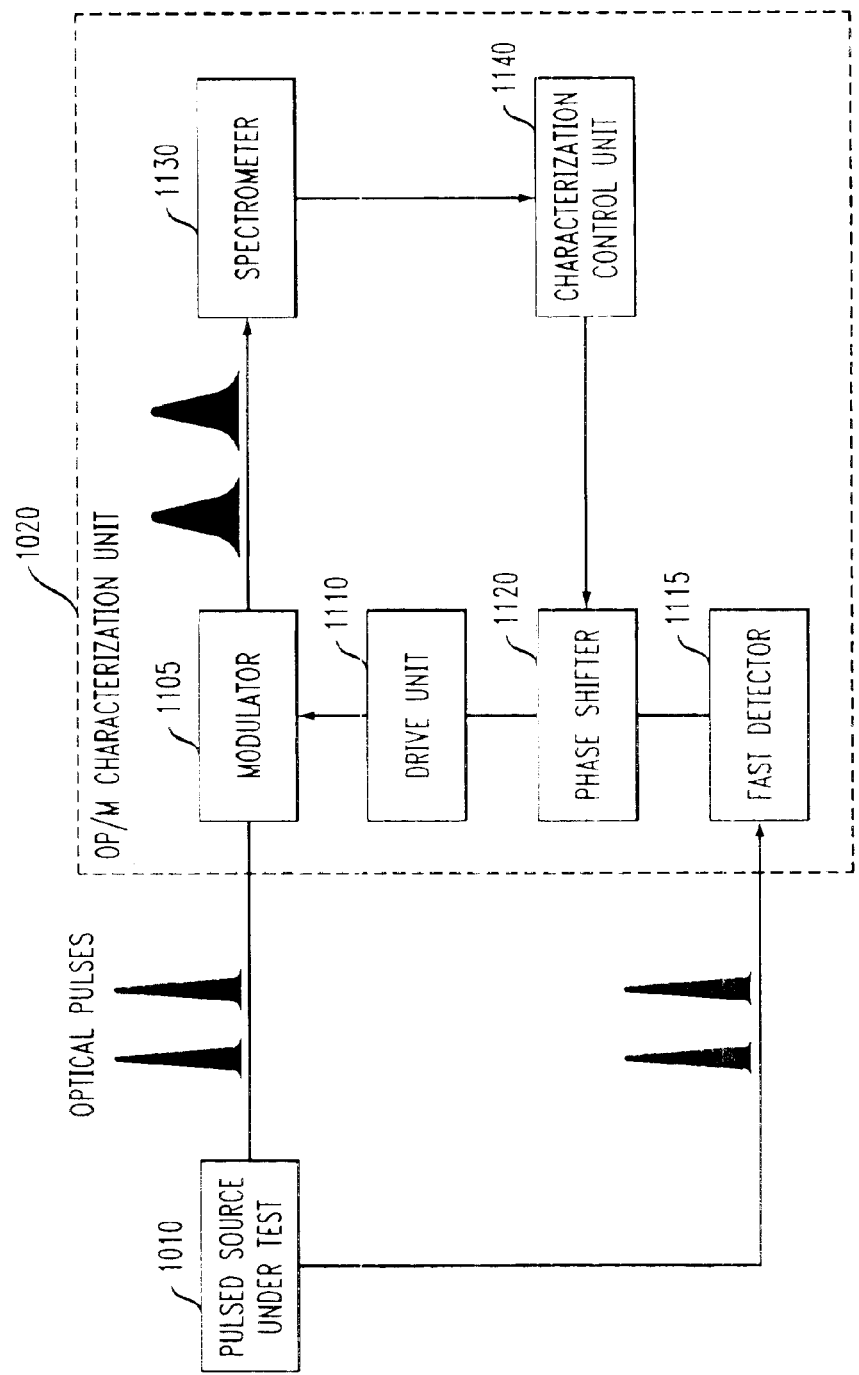
FIG. 8 depicts a high level block diagram of a test setup including a fourth embodiment of the present invention including a fast detector.

FIG. 8 depicts a test setup including an embodiment of the present invention comprising a fast detector. The OP/M characterization unit of FIG. 8 is substantially identical to the OP/M characterization unit 640 of FIG. 6 with the exception that the RF clock 620 of FIG. 6 is replaced by a fast detector in FIG. 8. The OP/M characterization unit of FIG. 8 is configured for the simultaneous characterization of user generated optical pulses and a modulator provided within the OP/M characterization unit. The test setup 800 of FIG. 8 comprises a pulsed optical source 1010, and an OP/M characterization unit 1020. The optical source 1010 generates a train of substantially identical pulses which are coupled to the OP/M characterization unit 1020.

The OP/M characterization unit 1020 of FIG. 8 comprises a modulator 1105, a drive unit (illustratively a modulator driver) 1110 for the modulator 1105, a fast detector 1115, a delay unit (illustratively a programmable phase shifter) 1120, a frequency-resolving device (illustratively a spectrometer) 1130, and a characterization control unit 1140. Although in FIG. 8 some components of the OP/M characterization unit 1020 are depicted as illustratively comprising specific components, various other components performing substantially the same functions can be utilized within the context of the present invention. For example in an alternate embodiment of the present invention, the function of the frequency-resolving device of the OP/M characterization unit is implemented using a Fabry-Perot etalon followed by a photodiode.

In the OP/M characterization unit 1020, the fast detector 1115 provides an electrical time-dependent signal that is synchronized to the pulse source under test. This time-dependent signal is, for example, a voltage or a current. This time-dependent signal is sent to the modulator driver 1110 to generate the modulation of the optical pulses via the modulator 1105 after phase-shifting by the phase shifter 1120 through the drive unit 1110. Note that the time-dependent signal provided by the fast detector can be processed or conditioned in various ways, and that the relative positions of a phase shifter, a drive unit and a conditioning unit, if any, is arbitrary. As such, the modulation is provided with respect to the optical pulses generated by the optical source 1110. The modulated optical pulses are then coupled to the spectrometer 1130, wherein the spectrum of the modulated optical pulses is measured. The spectrometer 1130 transmits the spectrum of the modulated optical pulses to the characterization control unit 1140.

The characterization control unit 1140 of FIG. 8 operates substantially identically to the characterization control unit 240 of FIG. 1. That is, the characterization control unit 1140 records the spectrum information of the measured optical pulses as an entry in a spectrogram maintained in the characterization control unit 1140. It should be noted that, in the present embodiment, the modulator 1105 and the optical pulses created by the optical source 1010 are driven at the frequency provided by the fast detector 1115. This can be accomplished because the signal from the fast detector 1115 is coupled to the modulator driver 1110 of the OP/M characterization unit 1020 driving the modulator 1105.

After the spectrum of the modulated optical pulses is recorded in the spectrogram contained in the characterization control unit 1140, the characterization control unit 1140 transmits a control signal to the programmable phase shifter 1120 to increment the relative delay between the modulation and the train of optical pulses. The programmable phase shifter 1120 provides the relative delay by adding a delay to the signal from the fast detector 1115 coupled the modulator driver 1110. The optical pulses from the optical source are now modulated by the modulator 1105 at a different relative delay.

As mentioned above, although in the above embodiment a relative delay is added by providing a delay to the modulation of the optical pulses, in an alternate embodiment of the present invention, a relative delay is provided, within the teachings of the present invention, by keeping the modulation of the optical pulses fixed and delaying the optical pulses from the optical source 1110. The optical pulses produced by the optical source 1010 will then have a relative delay compared to the modulation of the optical pulses by the modulator 1105.

In an alternate embodiment of the present invention, the function of the delay unit for providing a relative delay between the train of optical pulses and the modulation is accomplished using a delay line. That is, the train of optical pulses is delayed using an optical delay line, i.e. a device that modifies the optical path (for example the distance) that needs to be traveled by the optical pulses before reaching the characterization unit. In that embodiment, the time of arrival of the train of optical pulses at the characterization unit is modified, while all the other parameters are kept constant.

Returning to FIG. 8, as in the first embodiment, the optical spectrum of the newly modulated optical pulses is then once again measured by the spectrometer 1130. The spectrometer 1130 transmits the spectrum information of the newly modulated optical pulses to the characterization control unit 1140. The characterization control unit 1140 records the spectrum of the newly modulated optical pulses at the location of the corresponding relative delay in the spectrogram. The characterization control unit 1140 then sends a control signal to the programmable phase shifter 1120 to again increment the relative delay between the modulation of the modulator 1105 and the phase of the optical pulses. This process continues until an accumulated relative delay is equal to the spectrogram period. The characteristics of the optical pulses and modulator 1105 are then determined as described above for the first embodiment of the OP/M characterization unit 140 of FIG. 1.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method, comprising:
    a) modulating, using a modulator, a train of optical pulses;
    b) measuring a spectrum of said modulated train of optical pulses;
    c) recording said measured spectrum as an entry in a spectrogram at a position in said spectrogram corresponding to a relative delay between said modulation and said train of optical pulses;
    d) incrementing said relative delay;
    e) repeating steps (a), (b), (c), and (d) until the accumulated relative delay is equal to the period of said spectrogram; and
    f) characterizing said train of optical pulses and said modulator using said measured spectra recorded in said spectrogram.

2. The method of claim 1, wherein said spectrogram is constructed using an equation as follows:

$$S(\omega, \tau) = \left| \int_{-\infty}^{+\infty} E'(t, \tau)\exp(-i\omega t)dt \right|^2 = \left| \int_{-\infty}^{+\infty} E(t)R(t-\tau)\exp(-i\omega t) \right|^2$$

wherein $\omega$ is the optical frequency, $\tau$ is the relative delay between said modulation and said train of optical pulses, E(t) is the electric field of said train of optical pulses, and R(t) is the temporal response function of said modulator.

3. The method of claim 2, wherein E(t) and R(t) are determined by a two-dimensional blind deconvolution algorithm.

4. The method of claim 3, wherein said two-dimensional blind deconvolution algorithm is stored in and performed by a characterization control unit.

5. The method of claim 1, wherein said spectrums are measured using an optical spectrum analyzer.

6. The method of claim 1, wherein said spectra are measured using a Fabry-Perot etalon followed by a photodetector.

7. The method of claim 1, wherein said relative delay is incremented by varying a delay to a clock signal coupled to a modulator driver of said modulator, wherein the non-delayed clock signal is also coupled to an optical source generating said train of optical pulses.

8. The method of claim 1, wherein said relative delay is incremented by varying a delay to a clock signal coupled to an optical source generating said train of optical pulses, wherein the non-delayed clock signal is also coupled to a modulator driver of said modulator.

9. The method of claim 1, wherein said relative delay is incremented by delaying said train of optical pulses using an optical delay line.

10. The method of claim 1, wherein a fast photodetector generates a time-varying signal from said train of optical pulses, said signal being operative to drive said modulator.

11. The method of claim 1, wherein said relative delay is incremented using a delay unit.

12. The method of claim 11, wherein said delay unit is a programmable phase shifter.

13. The method of claim 1, wherein said relative delay is incremented in equal intervals until the accumulated relative delay is equal to the period of said spectrogram.

14. An apparatus for characterizing a train of optical pulses and a modulator, comprising:
   said modulator, for modulating said train of optical pulses;
   a drive unit, for controlling the modulation of said modulator;
   a detector, for measuring a spectrum of said train of optical pulses;
   a delay unit, for incrementing a relative delay between said modulation and said train of optical pulses; and
   a characterization control unit comprising a memory, for storing a spectrogram and program instructions, and a processor for executing said instructions to configure the apparatus to perform the steps of:
   a) modulating, using said modulator, said train of optical pulses;
   b) measuring a spectrum of said modulated train of optical pulses;
   c) recording said measured spectrum as an entry in said spectrogram at a position in said spectrogram corresponding to a relative delay between said modulation and said train of optical pulses;
   d) incrementing said relative delay;
   e) repeating steps (a), (b), (c), and (d) until the accumulated relative delay is equal to the period of said spectrogram; and
   f) characterizing said train of optical pulses and said modulator using said measured spectra recorded in said spectrogram.

15. The apparatus of claim 14, wherein said spectrogram is constructed using an equation as follows:

$$S(\omega, \tau) = \left| \int_{-\infty}^{+\infty} E'(t, \tau) \exp(-i\omega t) dt \right|^2 = \left| \int_{-\infty}^{+\infty} E(t) R(t - \tau) \exp(-i\omega t) \right|^2$$

wherein $\omega$ is the optical frequency, $\tau$ is the relative delay between said modulation and said train of optical pulses, $E(t)$ is the electric field of said train of optical pulses, and $R(t)$ is the temporal response function of said modulator.

16. The apparatus of claim 15, wherein $E(t)$ and $R(t)$ are determined by a two-dimensional blind deconvolution algorithm.

17. The apparatus of claim 16, wherein said two-dimensional blind deconvolution algorithm is stored in and performed by said characterization control unit.

18. The apparatus of claim 14, further comprising a fast photodetector that generates from said train of optical pulses a time-varying signal used to control said modulator.

19. The apparatus of claim 18, wherein said delay unit varies a delay to the signal from said fast photodetector to increment said relative delay.

20. The apparatus of claim 14, wherein said detector is an optical spectrum analyzer.

21. The apparatus of claim 14, wherein said detector is a Fabry-Perot etalon followed by a photodetector.

22. The apparatus of claim 14, wherein said delay unit is a programmable phase shifter.

23. The apparatus of claim 22, wherein said programmable phase shifter is controlled by said characterization control unit.

24. The apparatus of claim 14, wherein said relative delay is incremented in equal intervals until the accumulated relative delay is equal to the period of said spectrogram.

25. The apparatus of claim 14, further comprising a clock for providing a clock signal to an optical source of said train of optical pulses and to said modulator.

26. The apparatus of claim 14, wherein said modulator is an electro-absorption modulator.

27. An apparatus for characterizing a modulator and a train of optical pulses, wherein said train of optical pulses is modulated by said modulator, comprising:
   an optical pulse source, for providing said train of optical pulses to said modulator;
   a drive unit, for controlling the modulation of said modulator;
   a detector, for measuring a spectrum of said train of optical pulses;
   a delay unit, for incrementing a relative delay between said modulation and said train of optical pulses; and
   a characterization control unit comprising a memory for storing a spectrogram and program instructions and a processor for executing said instructions to configure the apparatus to perform the steps of:
   a) modulating, using a said modulator, said train of optical pulses;
   b) measuring a spectrum of said modulated train of optical pulses;
   c) recording said measured spectrum as an entry in said spectrogram at a position in said spectrogram corresponding to a relative delay between said modulation and said train of optical pulses;
   d) incrementing said relative delay;
   e) repeating steps (a), (b), (c), and (d) until the accumulated relative delay is equal to the period of said spectrogram; and
   f) characterizing said train of optical pulses and said modulator using said measured spectra recorded in said spectrogram.

28. The apparatus of claim 27, wherein said spectrogram is constructed using an equation as follows $$S(\omega, \tau) = \left| \int_{-\infty}^{+\infty} E'(t, \tau) \exp(-i\omega t) dt \right|^2 = \left| \int_{-\infty}^{+\infty} E(t) R(t - \tau) \exp(-i\omega t) \right|^2$$

wherein $\omega$ is the optical frequency, $\tau$ is the relative delay between said modulation and said train of optical pulses, $E(t)$ is the electric field of said train of optical pulses, and $R(t)$ is the temporal response function of said modulator.

29. The apparatus of claim 28, wherein $E(t)$ and $R(t)$ are determined by a two-dimensional blind deconvolution algorithm.

30. The apparatus of claim 29, wherein said two-dimensional blind deconvolution algorithm is stored in and performed by said characterization control unit.

31. The apparatus of claim 27, further comprising a fast photodetector that generates from said train of optical pulses a time-varying signal used to control said modulator.

32. The apparatus of claim 27, wherein said delay unit varies a delay to the signal from said fast photodetector to increment said relative delay.

33. The apparatus of claim 27, wherein said detector is an optical spectrum analyzer.

34. The apparatus of claim 27, wherein said detector is a Fabry-Perot etalon followed by a photodetector.

35. The apparatus of claim 27, wherein said delay unit is a programmable phase shifter.

36. The apparatus of claim 35, wherein said programmable phase shifter is controlled by said characterization control unit.

37. The apparatus of claim 27, wherein said relative delay is incremented in equal intervals until the accumulated relative delay is equal to the period of said spectrogram.

38. The apparatus of claim 27, wherein said optical pulse source is any optical light source providing a train of optical pulses.

39. The apparatus of claim 27, wherein said optical pulse source is a semiconductor laser followed by a modulator.

40. The apparatus of claim 27, further comprising a clock for providing a clock signal to said optical pulse source and to said modulator.

* * * * *